United States Patent [19]
Bretschneider et al.

[11] 3,725,470
[45] Apr. 3, 1973

[54] AMINO ACID DERIVATIVES

[75] Inventors: Hermann Bretschneider, Innsbruck, Austria; Ado Kaiser, Neufrenkendorf, Switzerland; Kraft Hohenlohe-Oehringen, Innsbruck, Austria

[73] Assignee: Hoffmann-La Roche Inc., Nutley, N.J.

[22] Filed: May 8, 1970

[21] Appl. No.: 35,876

[30] Foreign Application Priority Data

May 14, 1969 Switzerland..........................7350/69
May 14, 1969 Switzerland..........................7351/69
May 14, 1969 Switzerland..........................7352/69

[52] U.S. Cl............260/519, 260/471 A, 260/559 A, 424/319, 424/324
[51] Int. Cl......................C07c 65/02, C07c 101/00
[58] Field of Search..........................260/519, 471 A

[56] References Cited

UNITED STATES PATENTS 2,477,537  7/1949  Avakian et al. .......................260/519
2,795,605  6/1957  Vassel...................................260/519

OTHER PUBLICATIONS

March, "Advanced Organic Chemistry," 1968, pages 428–429.
Fieser et al., "Organic Chemistry," 3rd ed., 1956, pages 540–543.

*Primary Examiner*—Lorraine A. Weinberger
*Assistant Examiner*—R. S. Weissberg
*Attorney*—Samuel L. Welt, Bernard S. Leon, William H. Epstein and George M. Gould

[57] ABSTRACT

A process for preparing 3,4-dihydroxy phenylalanine derivatives including novel 3,4-dihydroxy phenylalanine derivatives wherein the phenyl ring contains an additional substituent which can be hydroxy, lower alkyl, lower alkoxy, halogen, nitro or amino groups from a mono hydroxy phenyl alanine including novel intermediates in this process. The novel 3,4-dihydroxy-phenylalanine derivatives are useful as blood pressure lowering agents and as anti-parkinson agents.

13 Claims, No Drawings

AMINO ACID DERIVATIVES

SUMMARY OF THE INVENTION

In accordance with this invention, a process is provided for producing a compound of the formula:

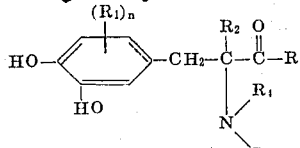

wherein $R_1$ is hydrogen, hydroxy, lower alkyl, lower alkoxy, halogen, nitro or amino; $R_2$ is hydrogen or lower alkyl; R is hydroxy, amino or alkyl substituted amino; $R_4$ is hydrogen, lower alkyl, lower alkanoyl or aroyl; $R_5$ is hydrogen or lower alkyl; and $n$ is an integer from 1 to 3;
and salts thereof from a compound of the formula:

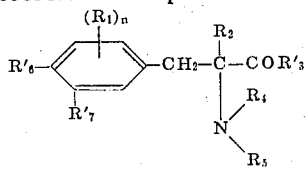

wherein $n$, $R_1$, $R_2$, $R_4$ and $R_5$ are as above; and one of $R'_6$ or $R'_7$ is hydroxy and the other is lower alkanoyl, aroyl or carboxy; and $R'_3$ is hydroxy, lower alkoxy, amino and alkyl substituted amino.

In accordance with a preferred embodiment of this invention, the aforementioned process provides a simple and economical means for producing a compound of the formula:

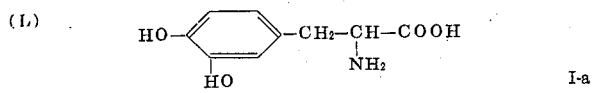

which is L-dopa. L-dopa has been found to be a remarkably effective therapeutic agent in the treatment of parkinson's disease In accordance with another embodiment of this invention, the process of this invention provides a simple and economical means for preparing the known antihypertensive agents which have the formula:

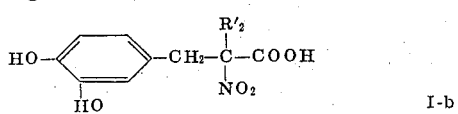

wherein $R'_2$ is lower alkyl.

In accordance with another embodiment of this invention, the process of this invention provides a simple and economical means for producing novel compounds of the formula:

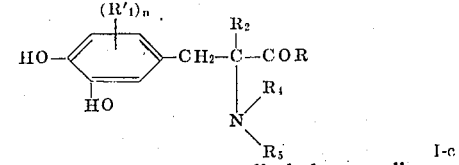

wherein $R'_1$ is hydroxy, lower alkyl, lower alkoxy, halogen, nitro or amino; R , $R_2$, $R_3$, $R_4$, $R_5$ and $n$ are as above;
and salts thereof.

The compounds of formula I-c and their salts are useful as blood pressure lowering agents and as anti-parkinson agents.

According to another aspect of this invention, a process is provided for producing starting materials of formula II.

DETAILED DESCRIPTION OF THE INVENTION

As used herein, the term "halogen" includes all four halogens, i.e., bromine, chlorine, iodine, and fluorine, with chlorine being preferred. The term "lower alkyl" comprehends both straight and branched chain saturated hydrocarbon moieties having from one to six carbon atoms, such as methyl, ethyl, propyl, i-propyl, t-butyl and the like. The term "lower alkoxy" comprehends moieties which can be designated-O-(lower alkyl), wherein lower alkyl is defined as above. Among the lower alkoxy moieties are included methoxy, ethoxy, propoxy and the like.

The term "lower alkanoyl" comprehends residues of lower alkane carboxylic acids having from one to six carbon atoms such as acetyl, butyryl, capronyl, and the like.

The term "aroyl" includes aroyl moieties containing from seven to 11 carbon atoms such as benzoyl or naphthoyl. The preferred aroyl radical is benzoyl. The term "alkyl substituted amino" includes mono-lower alkyl substituted amino and di-lower alkyl substituted amino groups, wherein lower alkyl is as defined above. Among the preferred alkyl amino groups are included methylamino, N,N-diethylamino, ethylamino, N,N-dimethylamino, N-methyl-N-ethylamino.

The compounds of formula I-c and their salts are useful as blood pressure lowering agents and anti-parkinson agents. The compounds of formula I-c above, as well as their salts, are used in the form of conventional pharmaceutical preparations which contain said compounds in connection with conventional pharmaceutical organic or inorganic materials suitable for internal administration. The pharmaceutical compositions containing the compounds of formula I-c above, as well as their acid salts, can be administered parenterally or orally. Dosages can be adjusted to individual requirements, for example, these compounds can be administered in dosages of from about 1 mg/kg to about 100 mg/kg per day. These dosages can be administered in a single dosage form or in divided dosage forms. The pharmaceutical compositions can contain conventional organic or inorganic inert carrier materials such as water, gelatin, lactose, starch, magnesium stearate, talc, vegetable oils, gums, polyalkylene glycols, Vaseline or the like. The pharmaceutical preparations can be in conventional solid dosage forms such as tablets, dragees, suppositories, capsules or in conventional liquid dosage forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They also can contain other therapeutically useful materials.

The compounds of formula I about, in above, form of their free acids are amphoteric in character. These compounds readily dissolve in water as well as in acids or in alkalies in which they form salts.

In accordance with this invention, the compounds of formula I and their pharmaceutically acceptable salts exhibit the aforementioned beneficial therapeutic properties. The compounds of formula I form pharmaceutically acceptable salts with both inorganic and organic pharmaceutically acceptable acids as well as bases. Among the acids which the compounds of formula I form pharmaceutically acceptable acid addition salts are included, hydrochloric acid, hydrobromic acid, sulfuric acid, phosphoric acid, citric acid, acetic acid, succinic acid, maleic acid, methane sulfonic acid, p-toluene sulfonic acid and the like. Such acid addition salts are also within the scope of the invention.

The compounds of formula I above also form pharmaceutically acceptable basic salts. Among the pharmaceutically acceptable basic salts of the compound of formula I are included the alkali metal salts such as sodium or potassium, or the alkaline earth metal salts such as calcium.

Among the preferred products of formula I are included the following:
L-5-chloro-3,4-dihydroxyphenylalanine;
L-5-methoxy-3,4-dihydroxyphenylalanine;
D,L-α-methyl-3,4-dihydroxyphenylalanine;
L-α-methyl-3,4-dihydroxyphenylalanine;
D,L-3,4-dihydroxyphenylalanine;
L-3,4-dihydroxyphenylalanine; and
D,L-5,α-dimethyl-3,4-dihydroxyphenylalanine.

Where, in the compound of formula II, $R_1$ is hydrogen, hydroxy, lower alkoxy, lower alkyl, halogen or amino, $R'_3$ is hydroxy, lower alkoxy or lower alkyl substituted amino, and one of $R'_6$ and $R'_7$ is hydroxy and the other is lower alkanoyl, these compounds have the formula

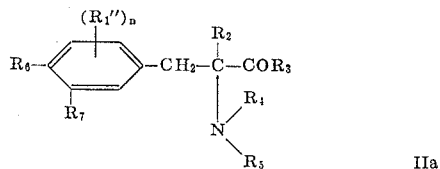

IIa wherein $R''_1$ is hydroxy, hydrogen, lower alkoxy, lower alkyl, halogen or amino; $R_2$ is hydrogen or lower alkyl; $R_3$ is hydroxy, alkoxy or lower alkyl substituted amino; $R_4$ is hydrogen, lower alkyl, lower alkanoyl or aroyl; $R_5$ is hydrogen or lower alkyl; and one of $R_6$ and $R_7$ is hydroxy and the other is lower alkanoyl; and $n$ is an integer of from 1 to 3.

The compounds of formula IIa are obtained, according to one aspect of the present invention, by reacting a compound of the formula

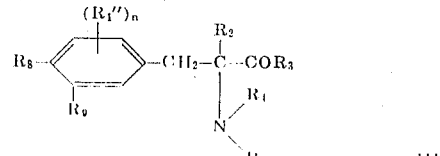

III wherein $R''_1, n, R_2, R_3, R_4$ and $R_5$ are as above; and one of $R_8$ and $R_9$ is hydrogen and the other is hydroxy, or a salt thereof, with an acid esterifying agent formed from lower alkanoic acids in the presence of a Friedel-Crafts catalyst.

The esterifying agent can be any functional derivative of a lower alkanoic acid. Among the functional derivatives of lower alkanoic acids are included acid halides of lower alkanoic acids such as acetylchloride, etc.; and anhydrides of lower alkanoic acids such as acetic anhydride, etc.

In converting a compound of the formula III to a compound of the formula IIa with a Friedel-Crafts catalyst, this reaction is preferably carried out in the presence of a heat dissipating agent. As the heat dissipating agent, there can be utilized any inert aprotic solvent. Among the conventional aprotic solvents which can be utilized in accordance with this invention are included nitrobenzene; halogenated benzenes such as chlorobenzene; halogenated aliphatic hydrocarbons such as carbon tetrachloride or tetrachloroethane; or carbon disulfide.

In carrying out this reaction, any conventional Friedel-Crafts catalyst can be utilized. Among the Friedel-Crafts catalysts, the strong Lewis acids are generally preferred. Among the conventional strong Lewis acids which can be utilized in accordance with this invention are included boron trihalides such as boron trifluoride, boron tribromide, etc.; aluminum trihalides such as aluminum trichloride, aluminum tribromide, etc.; titanium tetrahalides such as titanium tetrachloride, etc.; tin tetrahalides, such as tin tetrachloride, etc.; antimony trihalides such as antimony trichloride, etc., antimony pentahalides such as antimony pentachloride, etc.; or iron trihalides such as iron trichloride, iron tribromide, etc.

In carrying out this reaction to produce a compound of the formula II–a, temperature and pressure are not critical and this reaction can be carried out at room temperature and atmospheric pressure. Generally, this reaction can be carried out at a temperature of from about 0°C. to about 200°C. Generally, it is preferred to carry out this reaction at a temperature of from about 0°C. to about 180°C.

In a particularly preferred embodiment of this invention, when tyrosine is the compounds of formula III, this compound is converted to the compound of formula IIa utilizing aluminum chloride as the Friedel-Crafts catalyst, nitrobenzene as the solvent and acetyl chloride as the functional acid derivative, with temperatures of about 100°C. applied for at least two hours.

In accordance with another embodiment of this invention, the compound of the formula III is converted to the compound of the formula IIa by a two-step reaction process. In carrying out this process, a compound of the formula III is reacted with an acid esterifying agent to form a compound of formula

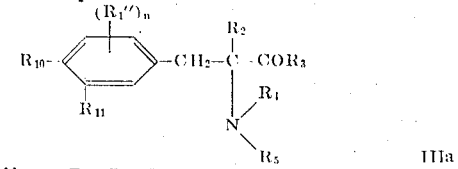

IIIa wherein $R''_1, n, R_2, R_3, R_4$ and $R_5$ are as above; and one of $R_{10}$ and $R_{11}$ is hdrogen and he oherloealanolo which compound or a salt thereof is then reacted with a Friedel-Crafts catalyst in the presence of a heat dissipating agent or irradiated with light of a wave length of from 250 to 350 nm. The acid esterifying agents are functional derivatives of lower alkanoic acids. Among the conventional functional acid derivatives of lower alkanoic acids are included, acid halides such as acetylchloride, and acid anhydrides, such as acetic anhydride. Generally, this reaction is carried out in the presence of a heat dissipating agent.

Among the conventional heat dissipating agents which can be utilized are included inert inorganic materials, such as sand, and aprotic solvents. Any of the conventional aprotic solvents mentioned hereinbefore can be utilized in carrying out this reaction. Furthermore, any of the conventional Friedel-Crafts-catalysts such as strong Lewis acids mentioned hereinbefore can be utilized. In carrying out this reaction, temperature and pressure are not critical and this reaction can be carried out at room temperature and atmospheric pressure. Generally, this reaction is carried out at a temperature of from about 0°C. to about 200°C. with temperatures of from about 20° to 180°C. being preferred.

In accordance with an embodiment of carrying out this two-step reaction, it is generally preferred to utilize aluminum chloride as the Friedel-Crafts catalyst, acetyl chloride as the esterifying agent and nitrobenzene as the aprotic solvent, when tyrosine is used as the starting material. In this preferred embodiment, it has been found to be expedient to heat the reaction mixture to about 100°C. for about 6 hours.

Another means of converting the compound of the formula IIIa to a compound of the formula IIa is by irradiating the compound of the formula IIIa with light having a wave length of from 250 to 350 $\mu$, with from 270 to 350 $\mu$ being preferred. In carrying out this step, any conventional light source capable of supplying light at a wave length of from 250 to 350 $\mu$ can be utilized. The compound of formula IIIa is irradiated while it is dissolved in an inert organic solvent. Any conventional inert organic solvent can be utilized. Among the preferred inert organic solvents are included, ethanol, benzene, or the like. This photochemical reaction is expediently carried out at a temperature of from 0°C. to about 70°C.

The compound of formula II, wherein $R_1$ is a nitro group, can be prepared from the compound of formula IIa wherein $R_1$ is hydrogen by conventional nitrating procedures. For example, a compound of formula IIa, wherein $R_1$ is hydrogen, can be treated with concentrated nitric acid to form the corresponding nitro group. If desired, this nitro compound can be reduced by conventional means to form an amino group.

The compounds formula II, wherein one of $R'_6$ or $R'_7$ is formyl can be prepared from the corresponding alkyl ether derivatives by a conventional formylation technique. For example, the alkyl ether derivative can first be treated with a functional derivative of formic acid such as hydrogen cyanide in the presence of a Friedel-Crafts catalyst such as aluminum chloride, titanium tetrachloride and then subjected to dealkylation with boron trichloride or boron trifluoride.

Compounds of formula II wherein one of $R'_6$ or $R'_7$ is hydroxy and the other is aroyl can be prepared according to the following exemplary reaction scheme:

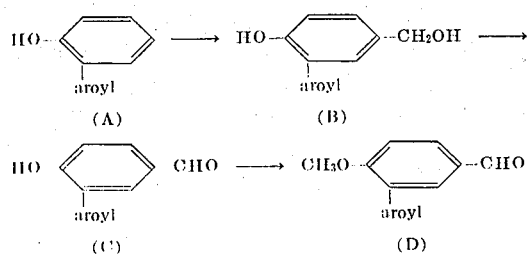

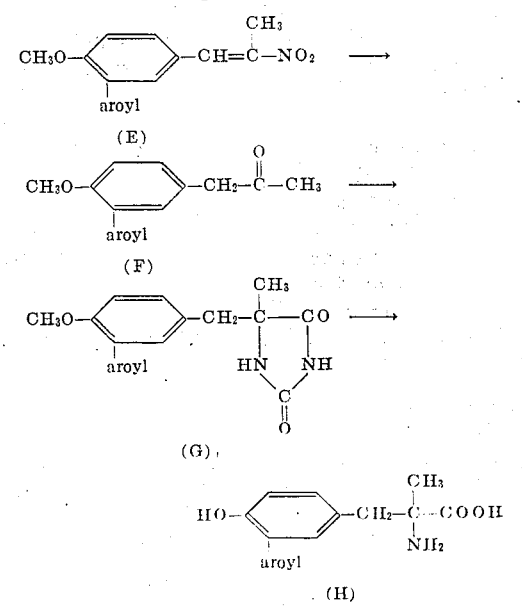

Step A → B comprises hydroxymethylation of A, e.g. by reaction with formaldehyde in an alkaline medium at room temperature; step B → C comprises oxidation of B, e.g. by means of manganese dioxide in methylene chloride to form the aldehyde C; step C → D comprises conversion of C to D, e.g. by reaction of C with dimethyl sulfate and potassium carbonate in acetone at reflux temperature; step D → E comprises e.g. reaction of D with nitro ethane and a catalyst, e.g. ammonium acetate, in nitro styrene at reflux temperature; step E → F comprises reaction of E with iron in aqueous acetic anhydride/water at reflux temperature; step F → G comprises treatment of F with potassium cyanide and ammonium carbonate; step G → H comprises treatment of G with concentrated hydrobromic acid.

Compounds of formula II wherein $R'_3$ is amino can be prepared e.g. by treating a compound of formula II, wherein $R'_3$ is lower alkoxy, with ammonia in a manner known per se, e.g. with gaseous ammonia in solution or with liquid ammonia.

The compounds of formula II wherein one of $R'_6$ and $R'_7$ is hydroxy and the other is carboxy can be prepared from the corresponding hydroxy compounds by first nitrating the hydroxy compound to produce a nitro substituent on either the 3- or 4- position of the phenyl ring moiety. Any conventional method of nitrating a phenyl ring can be utilized in carrying out this procedure. This nitro group can then be reduced by chemical or catalytic means to an amino group. Any conventional catalytic or chemical means commonly employed for converting a nitro group on a phenyl ring moiety to the corresponding amino phenyl compound can be used in this procedure. This amino group is then diazotized in an acidic solution utilizing conventional diazotizing procedures to form the corresponding diazonium salt. This diazonium salt is reacted by conventional procedures such as with cupric cyanide to give the corresponding cyano derivative. This cyano derivative is then saponified by conventional means such as with aqueous mineral acid or with an aqueous alkali metal hydroxide to form the compound of formula II, wherein one of $R'_6$ and $R'_7$ is hydroxy and the other is carboxy.

An illustration of this process can be seen from the preparation of α-methyl-3-carboxy-tyrosine utilizing α-methyl-tyrosine as a starting material. The α-methyl-tyrosine, which is utilized as a starting material, can be either in its optically active L or D forms or in the form of a racemic mixture. In the first step of this process, α-methyl-tyrosine is nitrated in a known manner to produce 3-nitro-α-methyl-tyrosine. The 3-nitro-α-methyl-tyrosine is reacted in a catalytic or chemical way to produce 3-amino-α-methyl-tyrosine, which is thereafter diazotized in an acidic solution to produce the corresponding diazonium salt. The diazonium salt can then be reacted with cupric cyanide to produce the 3-cyano-α-methyl-tyrosine which is then saponified to α-methyl-3-carboxy-tyrosine in a known manner by treating with an aqueous mineral acid or an aqueous alkali.

Among the preferred starting materials of formula II there are included those compounds, wherein $R_1$, $R_2$, $R_4$ and $R_5$ are hydrogen, $R'_6$ is hydroxy and $R'_7$ is lower alkanoyl.

A preferred starting material of formula II above is the compound wherein $R_1$, $R_2$, $R_4$, $R_5$ are hydrogen, $R'_3$ and $R'_6$ are hydroxy and $R'_7$ is acetyl or propionyl. Another preferred starting material of formula II above is the compound wherein $R_2$ is methyl; $R'_3$ and $R'_6$ are hydroxy; $R_4$ and $R_5$ are hydrogen; and $R'_7$ is acetyl or propionyl. Another preferred example of the compound of the formula II is the compound wherein $R_1$ is chlorine; $n$ is one; $R'_3$ and $R'_6$ are hydroxy; $R_2$, $R_4$ and $R_5$ are hydrogen; and $R'_7$ is acetyl.

The compounds of formulas II which are utilized as starting materials, can be either in their optically active L or D forms, or can be provided as a racemic mixture. Generally, it is preferred to utilize the starting materials of formulas II in their optically active L form. Furthermore, the compounds of formula II can be present as a free base or as a salt. The aforementioned conversion reactions also apply to the salt forms of the compounds of the formulas II as well as to these compounds in their free base forms.

Among the preferred intermediates of formula II are included:
3-acetyl-L-tyrosine;
3-propionyl-L-tyrosine;
N,3-diacetyl-L-tyrosine;
3-acetyl-5-chloro-L-tyrosine;
3-acetyl-5-bromo-L-tyrosine;
3-acetyl-5-fluoro-D,L-tyrosine;
4-acetyl-D,L-m-tyrosine; and
3-acetyl-α-methyl-L-tyrosine.

The compounds of the formula

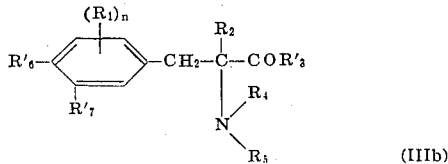

(IIIb)

can be converted to the compounds of formula I via intermediates of the formula

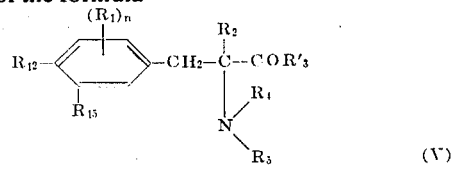

(V)

wherein one of $R_{12}$ and $R_{13}$ is hydroxy and the other is aroyloxy, lower alkanoyloxy or hydroxycarbonyloxy.

The compound of formula IIIb is converted to the compound of formula V by oxidizing the compound of formula IIIb with hydrogen peroxide or a derivative thereof. Any conventional derivative of hydrogen peroxide such as the organic or inorganic peroxides can be utilized in carrying out this reaction. Of the organic peroxides, the perorganic acids are generally utilized. Any conventional perorganic acid can be utilized in carrying out this reaction. Among the conventional perorganic acids which can be utilized are included, peracetic acid, pertrifluoroacetic acid, m-chloroperbenzoic acid or perphthalic acid, with peracetic acid being preferred. Any conventional inorganic peracid can be utilized. Among the conventional inorganic peracids which can be utilized, Caro's acid (permonosulfuric acid) and peroxydisulfuric acid are generally preferred.

The conversion of compounds of the formula IIIb to compounds of the formula V can take place in water or an alkaline medium or an acidic medium. Hydrogen peroxide is conveniently employed in an alkali medium, especially in aqueous caustic soda. Peracetic acid is preferably employed in an acidic medium, preferably dilute acetic acid. On the other hand, Caro's acid is generally employed in water. In carrying out this oxidation reaction, temperature and pressure are not critical and this reaction can be carried out at room temperature and atmospheric pressure. However, if desired, higher or lower temperatures can be utilized. Generally, this reaction is carried out at a temperature of from 0° to 70°C. When hydrogen peroxide or Caro's acid is utilized as the oxidizing agent, temperatures of from about 0° to 50°C. are generally preferred. When peracetic acid is utilized as the oxidizing agent, temperatures of from about 0° to 70°C. are generally preferred.

If the oxidation of the compound of formula IIIb is carried out in a neutral medium, the compound of formula V wherein one of $R_{11}$ or $R_{12}$ is a lower alkanoyloxy, aroyloxy or hydroxycarbonyloxy group is formed as an intermediate. The compound of formula V can be converted to the compound of formula I by conventional saponification procedures such as by treating the compound of formula V with an aqueous acid or aqueous alkali e.g. at a temperature between 0°C. and the reflux temperature of the reaction mixture, if desired in an inert atmosphere.

The oxidation of the compound of the formula IIIb under acidic or basic conditions or the saponification of the compound of formula V saponifies the hydroxycarbonyloxy, aroyloxy or lower alkanoyloxy groups contained thereon to produce a compound of formula I. However, the acylamino groups such as the alkanoylamino or aroylamino groups which are present on the compound of formula IIIb or formula V are retained during the aforementioned oxidation and saponification procedures.

If desired, the lower alkanoylamino or aroylamino groups on the compound of formula I can be hydrolyzed by conventional procedures. In carrying out this hydrolysis, the compound of formula I is treated with a dilute aqueous mineral acid at a temperature of above 30°C. Generally, this reaction is carried out at the reflux temperature of the reaction medium.

The hydrolyzed amino acids of formula I above are amphoteric. The carboxylic acid group on the compound of formula I can form the corresponding salts with bases such as those mentioned hereinbefore. On the other hand, the free amino group in the compound of formula I can form an acid addition salt by reaction with conventional acids such as those mentioned hereinbefore.

The compounds of formulas I, II, III, IV and V can exist in the form of a racemic mixture or in their optically active D or L forms. The racemic mixture of the compounds of formulas I, II, III, IV or V, can, if desired, be resolved during any stage of the process. These racemic mixtures can be resolved by conventional procedures. One means of resolving these compounds is by reacting these compounds with an optically active base such as quinine or brucine. On the other hand, these compounds can also be resolved, if desired, by reaction with an optically active acid such as tartaric acid.

The compounds of formula I obtained by this process, are obtained in pure form. Therefore, further purification is superfluous. Inorganic impurities which may be present can be removed in a simple manner with the aid of weakly basic or weakly acidic ion exchange resins.

The following examples are illustrative of the invention. All temperatures are in degrees centigrade. The petroleum ether utilized in these examples has a boiling point of about 40°–45°C. The concentrated hydrochloric acid utilized in these examples was an aqueous solution containing 37 percent by weight of hydrochloric acid. The half concentrated hydrochloric acid utilized in these examples was an approximately 5N-aqueous solution of hydrochloric acid.

EXAMPLE 1

Ten g. of O,N-diacetyl-L-tyrosine are finely ground with 20 g. of aluminum chloride and mixed with 80 g. of sea sand. The mixture is heated to 140°C. within 90 minutes and left at this temperature for 1 hour. After cooling, the cold reaction mixture is finely ground in a mortar and introduced into a stirred mixture of 20 ml. of concentrated aqueous hydrochloric acid, 250 ml. of ice and 500 ml. of ethyl acetate. Finally, with further stirring, it is saturated with sodium chloride. After 10 minutes stirring at 10°–15°C., the mixture is filtered and the aqueous phase of the filtrate, together with the sand stirred for a further 5 minutes with 400 ml. of ethyl acetate. The combined ethyl acetate phases are dried and evaporated. The residue of the crude reaction product (11 g.) is dissolved in acetone and brought to crystallization by portionwise addition of petroleum ether. There are obtained 8.8 g. of crude crystallizate with a melting point of 120°–140°C; $D^{20} = +21°$ (1 g. in 10 ml. of acetone). The N,3-diacetyl-L-tyrosine obtained after recrystallization from acetone-petroleum ether melts at 147°; $D^{20} = +27°$ (10 percent in acetone).

EXAMPLE 2

Fifty g. of L-tyrosine are suspended in 150 ml. of 2-N aqueous caustic soda. With stirring and external ice-cooling, 100 ml. of acetic acid anhydride and 2-N aqueous caustic soda are simultaneously added dropwise within an hour, the respective dropping rates being so adjusted that a pH of 7.5-7 is maintained. After completed addition, the mixture is adjusted to pH 2 with 4-N sulfuric acid and crystallized by triturating. After 30 minutes, it is filtered at 0°C., washed with ice-cold water and dried. There is obtained O,N-diacetyl-L-tryosine with a melting point of 170°–172°C.

EXAMPLE 3

In a 500 ml. four-neck flask, 21.2 g. of O,N-diacetyl-L-tyrosine, 160 ml. of nitrobenzene and 40 g. of aluminum chloride are heated to 100°C. (internal temperature) for 6 hours in an oil bath. On heating, the originally liquid batch solidifies after some time. After cooling, the reaction product is decomposed with 40 ml. of concentrated aqueous hydrochloric acid and 400 g. of ice. It is saturated with sodium chloride and extracted once with 800 ml. of ethyl acetate and then once with 400 ml. of ethyl acetate. The ethyl acetate extracts are shaken out with 80 ml. of 2-N aqueous caustic soda and then with 20 ml. of 2-N aqueous caustic soda and the combined alkaline solutions are back-washed with 500 ml. of petroleum ether. On acidification of the alkaline solution, with ice-cooling, to pH 1 with concentrated aqueous hydrochloric acid, there separates out a light-brown oil which immediately crystallizes. It is filtered off and washed with a little cold water. After drying over phosphorous pentoxide, there are obtained 16 g. of N,3-diacetyl-L-tyrosine with a melting point of 142°–144°C. The filtrate is concentrated in vacuo until sodium chloride precipitates. There again separates out an oil which gradually crystallizes. After drying over phosphorous pentoxide, the yield amounts to 1.0 g., melting point 116°–131°. Total yield 17.0 g.

A sample of the first crystallizate was recrystallized from water with the addition of active charcoal: $[\alpha]_D^{20} = +22.1°$ (acetone, $C = 1\%$).

EXAMPLE 4

While gassing with argon, 100 ml. of half-concentrated aqueous hydrochloric acid are heated to boiling with reflux condensation for about 15 minutes 8.8 g. of N,3-diacetyl-L-tyrosine are thereafter introduced into the hydrochloric acid. The mixture is then boiled for a further 40 minutes, likewise while gassing with argon. On cooling the solution, the reaction product precipitates. It is filtered off and the filtrate evaporated to dryness in vacuo. After drying over phosphorus pentoxide/potassium hydroxide, there is obtained 3-acetyl-L-tyrosine hydrochloride, m.p. = 217°C.

EXAMPLE 5

In a 3 l. beaker glass, 45 g. of α-methyl-D,L-tyrosine are suspended in 127.5 ml. of 2-N aqueous caustic soda with ice-cooling. 72 ml. of acetic acid anhydride and about 500 ml. of 2-N aqueous caustic soda are added dropwise to the cooled mixture within an hour in such a way that a pH of 6.5-7.5 is maintained. After completed addition, the mixture is allowed to stand at room temperature for 30 minutes. After this period, the mixture is cooled to 0°–5°C. and adjusted to pH 2 with about 100 ml. of concentrated hydrochloric acid. After trituration, O,N-diacetyl-α-methyl-D,L-tyrosine crystallizes out in about 30 minutes at 0°C. This product is filtered off by suction, being rinsed once with a little ice-water. The filtrate is evaporated in vacuo and the residue extracted with acetone. After evaporating off the acetone, the oily residue is dissolved in 60 ml. of water. After cooling and trituration, further O,N-diacetyl-α-methyl-D,L-tyrosine crystallizes out. It is dried over phosphorus pentoxide/potassium hydroxide. Yield 46.0 g; melting point 220°C.

EXAMPLE 6

Utilizing the procedure of Example 1, O,N-diacetyl-α-methyl-D,L-tyrosine is converted to N,3-diacetyl-α-methyl-D,L-tyrosine which melts at 207°–210°C. after recrystallization from acetone ether.

EXAMPLE 7

Utilizing the procedure of Example 3, O-acetyl-L-tyrosine hydrochloride is converted to 3-acetyl-L-tyrosine hydrochloride which melts at 217°C. with decomposition after recrystallization from 5-N aqueous hydrochloric acid.

EXAMPLE 8

Utilizing the procedure of Example 5, L-tyrosine is reacted with propionic acid anhydride to produce O,N-dipropionyl-L-tyrosine with a melting point of 152°–153°C.; $[\alpha]_D^{25} = +41.9°$ ($c = 1$ in methyl alcohol).

EXAMPLE 9

Utilizing the procedure of Example 3, O,N-dipropionyl-L-tyrosine is converted to N,3-dipropionyl-L-tyrosine which melts at 82°–90°; $[\alpha]_D^{25} = +37.6°$ ($c = 1$ in methanol).

EXAMPLE 10

Utilizing the procedure of Example 4, N,3-dipropionyl-L-tyrosine is converted to 3-propionyl-L-tyrosine hydrochloride with a melting point of 210°–212°C. (with decomposition); $[\alpha]_D^{25} = -1.0°$ ($c = 1$ in water).

EXAMPLE 11

Pulverized aluminum chloride (20 grams) and 10.6 g. of O,N-diacetyl-m-tyrosine were dissolved in 80 ml. of nitrobenzene. The resulting solution was heated for 6 hours at 100°C., cooled and introduced into a mixture of 200 ml. of ice water, and 20 ml. of concentrated aqueous hydrochloric acid. After saturation with sodium chloride, the aqueous phase was extracted twice, once with 400 ml. of ethyl acetate and then with 200 ml. of ethyl acetate. The combined ethyl acetate extracts were then extracted with 20 ml. of 2N aqueous sodium hydroxide. The resulting aqueous alkaline solution was washed twice with 250 ml. portions of petroleum ether and then acidified to a pH of 1 with concentrated aqueous hydrochloric acid. After acidification, the product precipitated from solution. After recrystallizing once from water with addition of activated charcoal, there was obtained 4 g. of N,4-diacetyl-m-tyrosine (m.p. 196°–198°C.) as colorless crystals.

EXAMPLE 12

A solution of 1 g. of O,N-diacetyl-L-tyrosine in 700 ml. of benzene and 20 ml. of methanol was irradiated at 30°C. for 45 hours with a low pressure mercury lamp. This lamp emitted light having a wave length of 254 μ. After this period, the solution was evaporated and N,3-diacetyl-L-tyrosine was isolated from the residue. This product was identical to the product in Example 3.

EXAMPLE 13

Into a solution of 21.2 g. of aluminum chloride in 80 ml. of nitrobenzene, at room temperature there are introduced 7.24 g. of L-tyrosine which, with stirring, dissolves after some time. After the addition of 3.45 ml. of acetyl chloride, the batch is heated to 100°C. for 6 hours, in doing which the solution gradually becomes viscous and then solidifies. After cooling to room temperature, the solidified mass is introduced into 40 ml. of concentrated aqueous hydrochloric acid and 200 g. of ice. The aqueous phase is extracted with 200 ml. of ethyl acetate, once more with 200 ml. of ethyl acetate and finally a third time with 220 ml. of ethyl acetate, and the remaining clear aqueous solution is concentrated to a volume of 50 ml. The reaction product thereby precipitates crystalline. After some standing at 0°C., it is filtered off and the crude product recrystallized from a little half-concentrated aqueous hydrochloric acid. After drying over potassium hydroxide and phosphorus pentoxide, the yield of 3-acetyl-L-tyrosine hydrochloride amounts to: 7.2 g. = 69%, decomposition point 227°–228°, $[\alpha]_D^{25} = -3.2°$ ($c = 1$, $H_2O$).

EXAMPLE 14

Utilizing the procedure of Example 13, L-tyrosine is reacted with propionyl chloride to produce 3-propionyl-L-tyrosine hydrochloride with a decomposition point of 223°–225°C.; $[\alpha]_D^{25} = -1.3°$ ($c = 1$ in water).

EXAMPLE 15

Twenty six g. of anhydrous aluminum chloride, 7.9 g. of acetyl chloride and 11.3 g. of N-acetyl-L-tyrosine are successively added to 110 ml. of nitrobenzene. All of the N-acetyl-L-tyrosine dissolved after about 10 minutes. The solution is then heated to 100°C. for 5 hours. After cooling the viscous, dark-brown reaction mixture to 20°C., a mixture of 250 g. of ice and 25 ml. of concentrated aqueous hydrochloric acid is added. After the addition of 60 g. of sodium chloride, the mixture is extracted twice with 500 ml. ethyl acetate each time. The organic extracts are washed twice with 100 ml. of saturated aqueous sodium chloride solution each time and then extracted three times with 50 ml. of 2-N aqueous sodium carbonate solution each time. The sodium carbonate extracts are brought to pH 1 with concentrated aqueous hydrochloric acid. The acidified solution is freed from the residual organic solvents in vacuum and then cooled to 4°C. for 14 hours.

The crystals which separate out are filtered off and recrystallized from water with the addition of active charcoal. There are obtained 7.1 g. (52 percent) of N,3-diacetyl-L-tyrosine, m.p. 142°–143°C. $[\alpha]_D^{20} = +22.4°$ ($c = 1$, acetone).

EXAMPLE 16

Utilizing the procedure of Example 13, but with a reaction time of 20 hours, 5-chloro-L-tyrosine is converted into 3-acetyl-5-chloro-L-tyrosine hydrochloride with a melting point of 231°C. (decomposition).

EXAMPLE 17

35.35 g. of aluminum chloride in pulverized form were dissolved in 133.5 mm. of nitrobenzene. To this resulting solution there was added 12 g. of m-tyrosine and 5.75 ml. of acetylchloride. The resulting mixture was heated at 100°C. for 6 hours, and then cooled, whereupon 66.6 ml of concentrated hydrochloric acid in the 335 ml. of ice water were added. The aqueous phase was separated and washed three times with 350 ml. portions of ethyl acetate, concentrated to a volume of 100 ml. and cooled, whereupon the reaction product crystallized and was filtered from the solution. After two recrystallizations from aqueous-5-n-hydrochloric acid solution, 7.7 g. of 4-acetyl-D,L-m-tyrosine hydrochloride was obtained with a melting point of 217°–220°C.

EXAMPLE 18

To a suspension of 33.9 g. of 3,α-dimethyl-D,L-tyrosine in 340 ml. of nitrobenzene, there was added 71.3 g. of water free aluminum chloride. When all of the aluminum chloride was dissolved (after about 10 minutes), the solution was mixed with 13.6 g. of acetyl chloride. The resulting mixture was allowed to stand for 18 hours while stirring and maintaining a temperature of 105°C. by heating. After this period, the reaction mixture was cooled to 50°C. with a mixture of 1,000 g. of ice and 100 ml. of concentrated hydrochloric acid. Thereafter, the resulting mixture was extracted once with 1,400 ml. of diethyl ether and then with 700 ml. of diethyl ether. The combined ether extracts were washed twice with 200 ml. of 2N-aqueous hydrochloric acid. The combined extracts were evaporated at 40°C. at a pressure of 12 mm Hg to a volume of about 400 ml. and then allowed to stand 12 hours at 4° C. The resulting crystals were filtered and then recrystallized from a 5N-aqueous hydrochloric acid solution, after the addition of activated charcoal. There resulted 33.7 g. of 3-acetyl-α,5- dimethyl-D,L-tyrosine hydrochloride in the form of colorless crystals having a melting point of 251°–255°C.

EXAMPLE 19

Eighty g. of aluminum chloride and 39 g. of 3-bromo-L-tyrosine were added to 300 ml. of nitrobenzene. 13.1 g. of acetylchloride was added to the resulting solution and the reaction mixture 39 allowed to stand for 18 hours at 120°C. (bath temperature) under constant stirring. After this, a mixture containing 300 g. of ice and 150 ml. of concentrated aqueous hydrochloric acid was added to this mixture. Thereafter, the mixture was extracted twice with 200 ml. portions of ethyl acetate. The organic phase was washed twice with 200 ml. portions of 2N-aqueous hydrochloric acid. The resulting extract was evaporated at 40°C., at a pressure of 11 mm Hg to a volume of 100 ml. The residue was allowed to stand for 14 hours while cooling at 4°C. The resulting crystals were filtered and recrystallized from 20 percent by weight aqueous hydrochloric acid. There resulted 38 g. of 3-acetyl-5-bromo-L-tyrosine hydrochloride; melting point 223°–224°C. (decomposition); $[\alpha]_D^{25} = +3.9°$; ($c$ = 1 percent in methanol).

EXAMPLE 20

To a suspension of 21.3 g. of aluminum chloride in 80 ml. of nitrobenzene, there was added 7.95 g. of 3-fluoro-D,L-tyrosine. To the resulting solution, there was added 3.5 ml. of acetyl chloride. Thereafter, the reaction mixture was allowed to stand for 15 hours at 105°C. under constant stirring. The dark reaction product was then cooled and poured into a mixture containing 200 g. of ice and 40 ml. of concentrated hydrochloric acid. After this, the reaction mixture was extracted twice with 200 ml. portions of ethyl acetate. The combined organic extracts were then extracted twice with 100 ml. portions of 2N-aqueous hydrochloric acid. The combined aqueous extracts were then evaporated to a volume of 50 ml. After this period, the resulting product was cooled at 40°C. for 14 hours. The resulting crystals were filtered and recrystallized from 20 percent hydrochloric acid. There was obtained 10.1 g of 3-acetyl-5-fluoro-D,L-tyrosine-hydrochloride in the form of brown crystals having a melting point of 238°C.

EXAMPLE 21

To a suspension of 30 g. of α-methyl-L-tyrosine in 450 ml. of nitrobenzene, there was added 53 g. of water free aluminum chloride. Upon dissolution (after about 10 minutes), 27 g. of acetyl chloride were added and the reaction mixture was heated to 100°C with stirring. The reaction mixture was then cooled to 50°C. and poured into a mixture of 900 g. of ice and 90 ml. of concentrated aqueous hydrochloric acid. The reaction mixture was then extracted twice with 1,500 ml. of diethyl ether. The ether extract was then extracted with two 300 ml. portions of 2N-aqueous hydrochloric acid. The combined aqueous extracts were evaporated at 40°C. at a pressure of 12 mm Hg. To the residue there was added 1,000 ml. of ethyl acetate. After this, the mixture was heated to boiling for 10 minutes and then allowed to stand for 20 hours at room temperature, the major portion of the aluminum chloride crystallizing out. These crystals were filtered off and the filtrate was evaporated at 40°C. at pressure of 11 mm Hg. The evaporated product was crystallized from ethyl acetate and there was obtained 3-acetyl-α-methyl-L-tyrosine hydrochloric acid as a colorless crystal material. The melting point 233°C. (decomposition); $[\alpha]_D^{25} = +2.9°$; ($c$ = 1 percent in water).

EXAMPLE 22

One hundred ml. of half concentrated hydrochloric acid was refluxed for 15 minutes under argon gas. 8.8 g. of N,3-diacetyl-L-tyrosine was added to the refluxing hydrochloric acid and reflux was continued for another 40 minutes under argon gas. After this period, the resulting solution was cooled and the precipitate removed from the solution. The filtrate was then evaporated under reduced pressure. After drying over phosphorus pentoxide and potassium hydroxide, there was obtained 3-acetyl-L-tyrosine-hydrochloride, melting point 217°C.; $[\alpha]_D^{20} = +3.9°$; ($c$=10 percent in water).

EXAMPLE 23

Two g. of 3-acetyl-L-tyrosine hydrochloride are dissolved in 11 ml. of 2N aqueous caustic soda. With stirring, external ice-cooling and flushing with nitrogen, 0.9 ml. of aqueous hydrogen peroxide (30 percent by weight) are added all at once. Despite stirring and external ice-cooling, after a short time the temperature in the flask rises from 3° to 19°C. After 10 minutes, the temperature in the reaction mixture has again fallen to 3°C. The reaction solution is thereupon brought to pH 5 by addition of concentrated aqueous hydrochloric acid. After brief standing in the ice-bath, the crystallizate is filtered off and washed with cold water. There are obtained 1.12 g. of L-3,4-dihydroxy-phenyl-alanine [L-dopa]; m.p. 275°–280°C. (decomposition).

EXAMPLE 24

With stirring and gassing with argon, 1.7 g. of 3-acetyl-L-tyrosine hydrochloride are dissolved at room temperature in 11 ml. of 2-N aqueous caustic soda. To the solution, cooled to +3°C., there are added 0.9 ml. of 30 percent by weight aqueous hydrogen peroxide. The temperature rises to about 16°C. to then gradually fall again to 3°C. The pH value is adjusted to 5 by addition of concentrated aqueous hydrochloric acid. The light-yellow L-3,4-dihydroxyphenyl-alanine which separates out after triturating after about 1 hour at 0°C. is filtered off by suction, covered once with a little ice-water and subsequently washed with ethanol and diethyl ether. Yield: 1.17 g. = 90%, melting point 275°–277°C. (dec.) $[\alpha]_D^{25} = -11.6°$ (N-hydrochloric acid, $c = 1$). A sample of the crude product is recrystallized from water with the addition of active charcoal and some sodium bisulfite while gassing with argon. Melting point 291°–293°C.; $[\alpha]_D^{25} = -11.3°$ (N-hydrochloric acid, $c = 1$)

EXAMPLE 25

Utilizing the procedure given in Example 24, 3-propionyl-L-tyrosine hydrochloride is converted to L-3,4-dihydroxyphenyl-alanine Yield: 85 percent, melting point 296°–298°C. $[\alpha]_D^{25} = -10.4°$ (N-hydrochloric acid, $c = 1$).

EXAMPLE 26

With stirring and gassing with argon, 2.63 g. of N,3-diacetyl-L-Tyrosine are dissolved at room temperature in 12 ml. of 2-N caustic soda. To the solution, cooled to 3°C., there are added 1.35 ml. of 30 percent by weight hydrogen peroxide, whereupon the temperature rises to 30°C. After renewed cooling to 3°C. the reaction mixture is acidified to pH 1 with concentrated aqueous hydrochloric acid and then evaporated to dryness under reduced pressure at 50°C. The residue is extracted four times with a total of 200 ml. of ethanol (hot). The combined ethanolic extracts are evaporated under reduced pressure. The residue is introduced into 30 ml. of half-concentrated aqueous hydrochloric acid which is previously heated for 15 minutes while gassing with argon, heated to boiling for 40 minutes while gassing with argon, cooled and evaporated under reduced pressure at 50°C. The residue is dissolved in 15 ml. of water. The L-3, 4-dihydroxyphenyl-alanine which precipitates on adjusting to pH 4 with sodium bicarbonate is filtered off by suction and washed with a little ice-water, ethanol and diethyl ether. Yield: 0.87 g. = 44.5%; melting point 272°–275°C. (decomposition) $[\alpha]_D^{25} = -10.1°$ (N-hydrochloric acid, $c = 1$).

EXAMPLE 27

Six g. of D,L-3-acetyl-α-methyl tyrosine hydrochloride are dissolved in 3.5 ml. of 2N-aqueous sodium hydroxide. After cooling this reaction mixture to 0° under nitrogen gas, there was added 0.35 ml. 30 percent by weight aqueous hydrogen peroxide aqueous solution. After standing for 10 minutes at 0°C., a small amount of sodium bisulfite was added. The reaction mixture was adjusted to a pH of 4 by the addition of concentrated aqueous hydrochloric acid. The resulting crystals were filtered at 0°C. and washed with ice water. 4.2 g. of D,L-α-methyl-dopa was obtained at a melting point of 290°–300°C. (decomposition).

EXAMPLE 28

11.2 g. of D,L-N,3-diacetyl-α-tyrosine was heated at boiling temperature for 3 hours in 100 ml. of aqueous hydrochloric acid solution (1:1 parts by volume). After this period, the reaction mixture was evaporated under reduced pressure and the residue was then crystallized twice from a mixture of acetone-diethyl ether to give D,L-3-acetyl-α-methyl-tyrosine-hydrochloride with a melting point of 200°–210°C. (decomposition).

EXAMPLE 29

Utilizing the procedure of Example 24, 4-acetyl-D,L-m-tyrosine-hydrochloride was converted to D,L-3,4-dihydroxy-phenyl-alanine with a melting point of 275.8°C.

EXAMPLE 30

To a mixture of 67 ml. of 2N-aqueous sodium hydroxide and 7 ml. of 32 percent by weight aqueous hydrogen peroxide solution, there was added portionwise 11 g. of 3-acetyl-α-5-dimethyl-D,L-tyrosine hydrochloride. This addition was carried out in an inert gas atmosphere under constant stirring with the temperature of the mixture being between 37°–45°C. After this addition, the mixture was stirred for 30 minutes wherein the temperature dropped to 35°C. Thereafter, the resulting mixture was cooled to 10°C. and sulfur dioxide gas was passed into the reaction mixture to destroy excess hydrogen peroxide. The solution was thereafter adjusted to a pH of 5 by the addition of concentrated hydrochloric aid. Thereafter the solution was evaporated to a volume of 50 ml. at a temperature of 40°C. and under a vacuum of 11 mm Hg. After standing for 48 hours at 4°C. the resulting crystals were filtered and recrystallized from water and there was obtained 1.4 m. of 3-(4,5-dihydroxy-m-tolyl)-2-methyl-D,L-alanine with a melting point of 287°C. (decomposition).

EXAMPLE 31

1.8 ml. of aqueous hydrogen peroxide (30 percent) were added at once to a solution of 3-acetyl-5-chloro-L-tyrosine hydrochloride in 22 ml. of 2N-aqueous sodium hydroxide at 3°C. The temperature of the mixture rapidly rose to 25°C. After completion of the reaction (after about 10 minutes), the resulting brown solution was cooled to 3°C. and its pH was adjusted to 5 by adding 6N-aqueous sulfuric acid, whereupon L-5-chloro-3,4-dihydroxy-phenylalanine crystallized out. Upon two crystallizations from water, the melting point of the product was 163°C. (decomposition); $[\alpha]_D^{25} = -5.5°$ (C = 1 percent in 1N-hydrochloric acid).

EXAMPLE 32

Utilizing the procedure of Example 31, 3-acetyl-5-bromo-L-tyrosine hydrochloride is converted to L-5-bromo-3,4-dihydroxy-phenylalanine.

EXAMPLE 33

Utilizing the procedure of Example 31, 3-acetyl-5-fluoro-D,L-tyrosine hydrochloride is converted to D,L-5-fluoro-3,4-dihydroxy-phenylalanine.

EXAMPLE 43

Utilizing the procedure of Example 26, N,3-dipropionyl-L-tyrosine is converted to L-3,4-dihydroxy-phenylalanine.

EXAMPLE 35

Utilizing the procedure of Example 26, N,4-diacetyl-m-tyrosine is converted to 3,4-dihydroxy-phenylalanine.

EXAMPLE 36

A mixture of 8.8 g. N,3-diacetyl-L-tyrosine, 38 ml. of acetic anhydride and 18 g. of peracetic acid (40 percent, in acetic anhydride) was held at a temperature of 22°C. for 90 hours, whereupon the mixture was evaporated to dryness at 40°C. and 12 mm Hg. The residue comprising 3-acetoxy-N-acetyl-L-tyrosine was heated in 50 ml of 3N-aqueous hydrochloric acid for 3 hours under an argon atmosphere. The resulting solution was evaporated to dryness under reduced pressure, whereby crude L-3,4-dihydroxy-phenylalanine hydrochloride was obtained, which was converted to L-3,4-dihydroxy-phenylalanine as described in Example 26.

EXAMPLE 37

Tablets are manufactured utilizing the following composition:

| | |
|---|---|
| L-5-chloro-3,4-dihydroxyphenyl-alanine | 100 mg. |
| Lactose | 61 mg. |
| Corn starch | 30 mg. |
| Polyvinylpyrrolidone | 4 mg. |
| Talcum | 5 mg. |

The active substance is mixed with the lactose and the corn starch and, after the addition of a solution of polyvinylpyrrolidone in 40 ml. of ethanol, granulated. The granulate is dried at 30°C., mixed with talcum and pressed to tablets.

| | |
|---|---|
| Individual weight of one tablet | 200 mg. |
| Active substance content of one tablet | 100 mg. |

EXAMPLE 38

Gelatin capsules are manufactUred utilizing the following composition:

| | |
|---|---|
| L-5-chloro-3,4-dihydroxyphenyl-alanine | 50.0 mg. |
| Mannitol | 98.5 mg. |
| Stearic acid | 1.5 mg. |

The ingredients are homogenously mixed and filled into No. 2 interlocking gelatin capsules via a capsule filling machine.

| | |
|---|---|
| Individual weight of one capsule | 150 mg. |
| Active substance content of one capsule | 50 mg. |

We claim:
1. A compound of the formula:

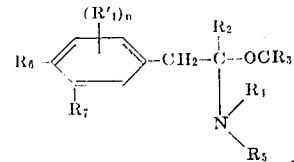

wherein R''$_1$ is hydroxy, hydrogen, lower alkoxy, lower alkyl, halogen or amino; R$_2$ is hydrogen or lower alkyl; R$_3$ is hydroxy or, lower alkoxy; R$_4$ is hydrogen, lower alkyl, lower alkanoyl or aroyl; R$_5$ is hydrogen or lower alkyl; and one of R$_6$ and R$_7$ is hydroxy and the other is lower alkanoyl; and $n$ is an integer from 1 to 3;
and acid or basic salts thereof.

2. The compounds of claim 1 wherein R''$_1$ is hydrogen.

3. The compound of claim 2 wherein said compound is 3-acetyl-L-tyrosine.

4. A compound of claim 2 wherein said compound is 3-propionyl L-tyrosine.

5. The compound of claim 2 wherein said compound is N,3-di-acetyl-L-tyrosine.

6. The compound of claim 2 wherein said compound is 4-acetyl-D,L-m-tyrosine.

7. The compound of claim 1 wherein R''$_1$ is lower alkyl.

8. The compound 34 claim 7 wherein said compound is 3-acetyl-α-5-dimethyl-D,L-tyrosine.

9. The compound of claim 7 wherein said compound is 3-acetyl-5-methyl-L-tyrosine.

10. The compound of claim 1 wherein R''$_1$ is halogen.

11. The compound of claim 10 wherein said compound is 3-acetyl-5-chloro-L-tyrosine.

12. The compound of claim 10 wherein said compound is 3-acetyl-5-fluoro-D,L-tyrosine.

13. The compound of claim 10 wherein said compound is 3-acetyl-5-bromo-L-tyrosine.

* * * * *

UNITED STATES PATENT OFFICE
CERTIFICATE OF CORRECTION

Patent No. 3,725,470    Dated April 3, 1973

Inventor(s) Herman Bretschneider, Ado Kaiser and Kraft Hohenlohe-Oehringen

It is certified that error appears in the above-identified patent and that said Letters Patent are hereby corrected as shown below:

Column 18, claim 1, lines 21-25

"
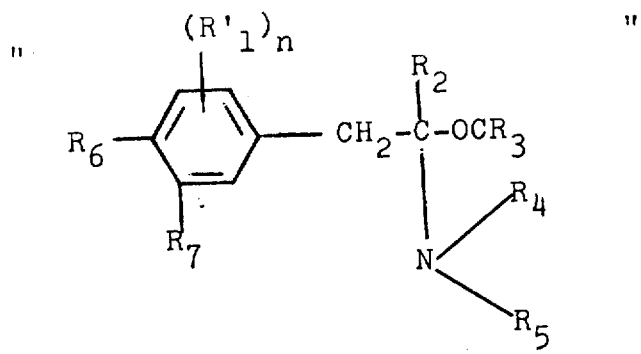
"

should be

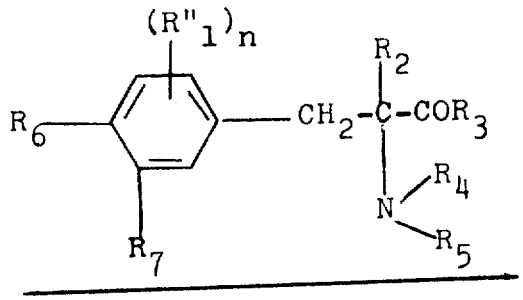

Column 18, line 46, claim 8, "compound 34 claim"

should be <u>compound of claim</u>

Signed and sealed this 9th day of April 1974.

(SEAL)
Attest:

EDWARD M.FLETCHER,JR.
Attesting Officer

C. MARSHALL DANN
Commissioner of Patents